United States Patent Office 2,822,339
Patented Feb. 4, 1958

2,822,339

PREPARATION OF ORIENTABLE PROTEIN-CONTAINING POLYMERS

Hugh J. Hagemeyer, Jr., Longview, Tex., and Elizabeth L. Oglesby, Kingsport, Tenn., assignors to Eastman Kodak Company, Rochester, N. Y., a corporation of New Jersey No Drawing. Application January 24, 1955
Serial No. 483,805

9 Claims. (Cl. 260—8)

This invention relates to orientable protein-containing polymers and their preparation, and is particularly concerned with polymers prepared by polymerizing acrylonitrile, with or without one or more other monoolefinic monomers, with a protein which has been unfolded by forming a protein-detergent complex.

Polyacrylonitrile is well known as a fiber-forming material from which high softening fibers of good mechanical properties can be produced. One of the primary disadvantages of the polyacrylonitrile fibers is their resistance to dyeing except under special conditions. The proteins, in general, are potential fiber-forming materials, but, in their native form, they resist molecular orientation, and the resulting fibers have low strengths and high moisture absorption.

Polyacrylonitrile fibers are usually formed by spinning from a dope of the polymers in organic solvents such as dimethyl formamide or dimethyl acetamide. In contrast to this, the proteins are generally insoluble in the organic solvents. Unlike the polyacrylonitrile fibers, the protein fibers can be readily dyed with such dyes as direct, acid wool dyes, and acetate dyes. It is desirable, however, to have polymeric compositions which can be oriented to form high strength fibers which are also readily dyed with the ordinary dyes known to the art.

It is accordingly an object of this invention to provide new and improved polymeric compositions which are capable of forming readily dyeable fibers having high softening points, high tensile strength, and good elongation.

Another object of the invention is to provide a new process whereby acrylonitrile, with or without one or more other monoolefinic monomers, is polymerized together with a protein which has been pretreated so as to unfold the protein molecule whereby composite unitary fiber-forming polymers are readily obtained which can be oriented to give high strength fibers having excellent dye affinity.

Another object of the invention is to provide new and useful polymer compositions which combine in a single polymer molecule the desirable chemical and physical characteristics of protein and of polyacrylonitrile, without suffering the disadvantages usually inherent in both such materials.

Another object of the invention is to provide a method whereby protein molecules are unfolded by forming a protein-detergent complex and wherein the protein molecules are immobilized in the unfolded state by polymerization therewith of monomeric material comprising a major proportion of acrylonitrile.

Other objects will be apparent from the description and claims which follow.

These and other objects are attained by means of this invention which comprises preparing orientable fiber-forming unitary polymers by heating, in the presence of a polymerization catalyst, a mixture of a protein-detergent complex and monomeric material consisting predominantly of acrylonitrile, with or without a minor amount of one or more other polymerizable monoolefinic monomers. The composite unitary polymers thereby obtained can be readily dissolved in the organic solvents ordinarily employed for dissolving polyacrylonitrile, and fibers can be spun therefrom having the desirable properties of polyacrylonitrile but, in addition, having an excellent affinity for dyes. In accordance with the invention, the protein-detergent complex is readily formed by heating a mixture of any of the well known fibrous, corpuscular, or globular proteins with any of the well known synthetic detergents to form protein-detergent complexes wherein the detergent amounts to from one-third to twice the weight of the protein material.

As is well known, protein molecules ordinarily exist in the form of a tightly coiled structure. This tightly coiled structure can be unfolded by reacting the protein with a detergent to form a complex. This unfolding of protein molecules was described by Lundgren, Inc. Eng. Chem., vol. 36, p. 370 (1944). The same unfolding action can be brought about with any of the other synthetic detergents, and particularly with any of the sulfonate, sulfosuccinate, or sulfate detergents known to the art (as typified by the Aerosol, Nacconol, or Duponol detergents which are well known in the trade). We have found that when the unfolded protein-detergent complex is heated in the presence of a polymerization catalyst in admixture with acrylonitrile alone or together with other monoolefinic monomers, a composite unitary polymer is obtained wherein the protein component is maintained in the unfolded, orientable state and chemically bound with the polymerized monomeric material into a unitary structure which cannot be separated into its component parts by the usual methods suitable for separating mixtures. In the polymerization process, the protein-detergent complex is apparently split, since the detergent is recovered unchanged and can be used repeatedly. Thus, the detergent appears to unfold the protein molecule and hold it in the unfolded state until such time as the monomer is polymerized with the complex and immobilizes the protein molecule in the unfolded state. The resulting polymers possess a unique combination of the desirable properties of all of the components including the high softening point, high tensile strength, etc. of the polyacrylonitrile, and the good dye affinity and moisture absorption of the protein. These polymers can be readily spun into synthetic fibers by the usual spinning techniques, including dry and wet spinning, and the fibers thereby formed can be drafted to cause orientation with a resultant increase in tenacity, and they can be readily dyed with any of the common direct, acid wool, or acetate dyes.

In practicing the invention, any of the well known protein materials are suitable for use. These include but are not limited to such materials as casein, soy bean α-protein, chicken feather keratin, gelatin, zein, peanut protein, cottonseed protein, egg albumen, and similar well known fibrous, corpuscular, or globular proteins. The proteins readily form complexes with any of the well known detergents provided sufficient detergent is employed to give a complex wherein the detergent amounts to at least one-third of the weight of protein. Thus, the protein and detergent can be reacted with an excess of the protein or with an excess of the detergent. The composition of the complex varies from 1 part by weight of detergent to 3 parts by weight of protein in the presence of excess protein, to 2 parts by weight of detergent to 1 part by weight of protein in the presence of excess detergent. In the range between these proportions, when no excess detergent or protein is present, the complexes combine in the proportion in which they are mixed. The complex readily forms upon admixing the protein with a suitable amount of the detergent, preferably in aqueous solution, and the complexing is accelerated by heating the mixture slightly for a period of from a few minutes to several hours. Ordinarily, the complex can be formed in periods of less than an hour by heating the mixture of aqueous detergent and protein at a temperature of from about 30 to 70°.

The detergent forms no part of the final polymer but merely serves to unfold the protein molecule. Consequently, the invention is not limited in the nature of the detergent used, and any of the well known detergents which are capable of unfolding protein molecules are suitable. Detergents which are particularly useful are the sulfonate, sulfosuccinate, and sulfate detergents which are well known in the art. These include, but are not limited to, such typical detergents as isopropyl naphthalene sodium sulfonate, diamyl sodium sulfosuccinate, dibutyl sodium sulfosuccinate, dihexyl sodium sulfosuccinate, dioctyl sodium sulfosuccinate, and similar materials known to the trade as Aerosol detergents; the alkyl, aryl, and alkylaryl sulfonates and alkali metal salts thereof, known to the trade as Nacconol detergents; as well as the alkali metal alkyl sulfates, such as sodium lauryl sulfate and the like, known to the trade as Duponol detergents. Such other materials as N-octadecyl disodium sulfosuccinamate, the fatty alcohol derivatives, and similar well known synthetic detergents can also be used In the preferred polymers prepared in accordance with this invention, from 5 to 50% of the polymer molecule desirably consists of the protein component and 95–50% of the polymer molecule desirably consists of polymerized monomeric material consisting predominantly or exclusively of acrylonitrile. In many cases, particularly when acrylonitrile is employed as the sole polymerizable monomer, the protein forms 20–50% by weight of the protein molecule in order to achieve a high dye affinity. When the monomeric material polymerized with the protein-detergent complex consists of a mixture of 75–98% by weight of acrylonitrile and 25–2% by weight of one or more other monoolefinic monomers, the amount of protein can amount to anywhere from 5 to 50%, particularly when the comonomer employed with the acrylonitrile is effective to increase the dye affinity. Such materials as the acrylamides, methacrylamides, maleamides, fumaramides, maleamates, fumaramates, citraconamides, itaconamides, citraconamates, itaconamates, acrylates, methacrylates, and vinyl esters are suitable comonomers for increasing the dye affinity of the polymeric product. It is often advantageous to employ a comonomer with the acrylonitrile in order to increase the extensibility of the resulting polymer particularly after drafting.

In the preferred practice of the invention, a mixture of 5–50% by weight of protein-detergent complex and 95–50% of a monomeric material is heated in the presence of a polymerization catalyst in according with usual polymerization practice to form the desired composite unitary fiber-forming polymer. As has been indicated, the acrylonitrile forms 75–100% by weight of the monomeric material with 25–0% by weight being other monoolefinic material. If desired, any of the well known polymerizable monoolefinic monomers can be employed with the acrylonitrile in order to increase the extensibility of the polymer. These polymerizable monoolefinic monomers are well known in the art, and the invention is not limited to any particular comonomer or combination of comonomers. As has been indicated, if it is desired to increase the dye affinity of the polymer as well as the extensibility, such comonomers as acrylamide, methacrylamide, N-methyl methacrylamide, N-methyl acrylamide, N-isopropyl acrylamide, N-butyl acrylamide, maleamide, fumaramide, itaconamide, citraconamide, the N-alkyl or N,N-dialkyl derivatives of such amides wherein the alkyl group contains 1–6 carbon atoms, methyl acrylate, ethyl acrylate, butyl acrylate, methyl methacrylate, ethyl methacrylate, vinyl acetate, vinyl formate, vinyl propionate, and similar monomers can be used. When the protein is employed in a sufficient amount to impart the desired dye affinity itself, such other polymerizable monoolefinic monomers as styrene, substituted styrenes, methacrylonitrile, ethylene, isobutylene, methyl vinyl ketone, 2-vinyl pyridine, 2-methyl-5-vinyl pyridine, methyl vinyl ether, ethyl vinyl ether, ethyl vinyl ketone, acrylic acid, methacrylic acid, and similar polymerizable monoolefinic monomers can be employed. The comonomer which is desirably employed is isopropenyl acetate.

The polymerization embodying the invention can be carried out in accordance with usual emulsion or solution polymerization techniques by heating the mixture of protein-detergent complex and monomeric material in the presence of a polymerization catalyst until polymerization has proceeded to a point where from 60 to 100% of the monomeric material has combined with the protein in a unitary polymeric structure. If desired, the acrylonitrile can be admixed with the protein and detergent before formation of the protein-detergent complex, whereby cyanoethylation is obtained during the complexing operation in the absence of any polymerization catalyst. The cyanoethylation can also be effected by treating the protein-detergent complex with acrylonitrile in the absence of a polymerization catalyst. In the preferred process, the protein-detergent complex is formed first and then the monomeric material and catalyst are added and the polymerization carried out in the usual manner. The polymerization can be accelerated by actinic light, by heating, by use of a polymerization catalyst, or by a combination of any of these means. Desirably, the polymerization is effected by heating the polymerization mixture to a temperature of 30–100° C. and desirably 35–70° C.

In effecting the polymerization, any of the well known polymerization catalysts can be employed. Particularly good results are obtained with the peroxy catalysts such as the peroxides, perborates, persulfates, and the like. Other well known polymerization catalysts such as the azines and ketazines can also be used. If desired, redox activated systems can be used in accordance with the usual polymerization practice. Thus, sodium bisulfite-potassium persulfate, hydrogen peroxide-ferrous ion, or benzoyl peroxide-sorbose-ferrous ammonium sulfate-sodium pyrophosphate-sodium stearate systems can be employed. Among the peroxy catalysts which are desirably employed are such materials as hydrogen peroxide, benzoyl peroxide, cumene hydroperoxide, tertiary butyl peroxide, the alkali metal persulfates, the alkali metal perborates, lauroyl peroxide, diacetyl peroxide, peracetic acid, and the like. The amount of catalyst is not critical and can be varied in accordance with the usual polymerization practice depending upon the concentration, proportions, and nature of the reactants, nature and dilution of the polymerization medium, temperature of polymerization and similar variable factors.

The polymerization is desirably effected in aqueous dispersion, which includes either true solutions or emulsions. The protein-detergent complex is readily soluble in water, and the polymerization is thus readily carried out by emulsifying the monomer or monomers in the aqueous solution of complex.

If desired, the polymerization can be carried out in the presence of other polymerization adjuvants, including emulsifying agents, activators, chain regulators, and the like. Particularly good results are obtained by effecting the polymerization in the presence of an alkyl mercaptan containing 4–18 carbon atoms in the alkyl group. The mercaptan controls the molecular weight distribution of the polymer and also reacts with persulfates to give sulfhydryl radicals which act to initiate polymer chains. If a mercaptan is employed, it is desirably employed in an amount of 0.01–2.0 mole percent based on the mixture of monomers employed. Typical alkyl mercaptans which are suitable include butyl mercaptan, octyl mercaptan, decyl mercaptan, myristyl mercaptan, lauryl mercaptan, and the like, with t-dodecyl mercaptan being preferred.

The polymers obtained in accordance with the invention exhibit a unitary structure and cannot be separated by solvent partition or fractional precipitation. Most of the detergent splits out of the complex and enters the polymerization medium during the course of the polymerization. Any residual detergent can be removed by spinning the fibers into a water-alcohol bath or by extraction of the fiber with aqueous acetone. In the polymer, the protein chains are in a linear or open configuration in which they can be drawn into alignment. The exact nature of the composite polymer is not known exactly, but there seem to be secondary valence bonds between the monomer and the protein formed during the polymerization. Since these polymers are orientable, they can be drafted to give high strength fibers, films or sheets. The fibers formed from the polymers of the invention have tenacities of the order of 2.5 to 5 g. per denier. Elongations of 15–30% are readily obtained. When it is desired to draft the fibers to an optimum degree of orientation, it is desirable to use a comonomer with the acrylonitrile in order to maintain or increase the elastic deformation or stretch, which is ordinarily decreased by increasing the orientation. A particular advantage of the polymer compositions of the present invention is their greatly improved wet strength. The polymers can be readily dissolved in such organic solvents as dimethyl formamide or dimethyl acetamide to give smooth spinning dopes which can be spun into fibers by conventional techniques. This solubility of the polymers in organic solvents is further evidence of the unitary character of the polymer molecules, since such proteins as casein and gelatin are not soluble in such solvents ordinarily. As has been indicated, the protein can be cyanoethylated by treatment with acrylonitrile in the absence of a polymerization catalyst, if desired. Cyanoethylation is often desirable since it imparts an improved affinity for acetate dyes and also enhances the strength and stretch of the polymer. Even in the case where the polymer is not treated with acrylonitrile before the polymerization begins, some cyanoethylation occurs during the emulsion polymerization because of the active amide and amino groups which are exposed in the unfolded protein.

The invention is illustrated by the following examples of certain preferred embodiments thereof, it being understood that the examples are included to illustrate the best mode of practicing the invention and not to limit the scope of the invention unless otherwise specifically indicated.

*Example 1*

A zein-detergent complex was formed by heating a mixture of 25 g. of zein and 300 cc. of 3.3% aqueous solution of dioctyl sodium sulfosuccinate for 15 minutes at 40° C. A 75 g. portion of acrylonitrile was added to the zein-detergent complex and partial cyanoethylation was carried out by raising the temperature to 60° C. Heat evolved during this reaction increased the temperature to 63° C. for 15 minutes. Thereafter, 20 cc. of a 3% aqueous solution of potassium persulfate and 0.5 g. of t-dodecyl mercaptan were added to the reaction mixture, and the emulsion polymerization was effected by heating the mixture at 60° for two hours. A 98% yield of white polymeric product was obtained. A 15% solids dope in dimethyl formamide was prepared and extruded into isopropyl alcohol. The resulting fibers drafted well in hot air, and the drafted filaments dyed easily with acid wool and acetate dyes.

*Example 2*

If desired, the protein need not be cyanoethylated prior to the polymerization. Thus, a zein-detergent complex was formed by heating a mixture of 25 g. of zein and 300 cc. of a 3.3% aqueous solution of dioctyl sodium sulfosuccinate for 15 minutes at 40° C. To the resulting zein-detergent complex was added 75 g. of acrylonitrile, 0.6 g. of potassium persulfate, and 0.5 g. of t-dodecyl mercaptan. The resulting mixture was heated at 60° C. for two hours, whereupon an 80% yield of composite polymer was obtained. Monofilament fibers were spun as in the preceding example and were found to have excellent affinity for acid wool and acetate dyes.

*Example 3*

One of the outstanding characteristics of the composite polymers of this invention is their compatibility with such materials as polyacrylonitrile. Thus, 50 g. of polyacrylonitrile having an average molecular weight of 60,000–80,000 was mixed with 50 g. of a zein-acrylonitrile polymer prepared as in the preceding examples (38% zein) by ball milling for 8 hours. The resulting polymer mixture formed an 18% dope in dimethyl formamide. The dope filtered easily and was spun into isopropyl alcohol and drafted in hot air. A white, lustrous fiber was obtained having a good affinity for acid wool dyes and acetate dyes and having a tenacity of 4.26 g. per denier and 16.4% elongation.

*Example 4*

A casein-detergent complex was prepared, cyanoethylated and polymerized with acrylonitrile as in Example 1. An 80% yield of white polymer was obtained. A dimethyl formamide dope containing 16% solids was prepared from this polymer, and the dope was spun into isopropanol, and the resulting fibers drafted in hot air. These fibers had a tenacity of 4.1 g. per denier, 14.5% stretch, and good affinity for acid wool and acetate dyes. Thus, any of the proteins can be used in preparing the improved polymers embodying the invention, and the polymers can be used for spinning directly or can be used in admixture with other polymers such as polyacrylonitrile.

*Example 5*

The extensibility of the polymers of this invention can be enhanced by employing a comonomer with the acrylonitrile in an amount of from about 2 to 25% by weight based on the weight of the monomer employed. In a typical case, 10 g. of dioctyl sodium sulfosuccinate and 25 g. of zein were dissolved in 300 ml. of distilled water to form the protein-detergent complex. Thereafter, 20 ml. (0.6 g.) of 3% potassium persulfate and 0.5 g. of t-dodecyl mercaptan were added, followed by 65 g. of acrylonitrile and 10 g. of isopropenyl acetate. The resulting mixture was stirred and heated to 60° C. in an atmosphere of nitrogen. The resulting zein-acrylonitrile-isopropenyl acetate composition separated from the emulsion as a thick viscous slurry. After two hours at 60° C., 200 ml. of water was added, and the slurry was filtered. The dried polymer weighed 86 g. and formed a 17% solids dope in dimethyl formamide. Fibers, formed by spinning into water and drafting in hot air, had a tenacity of 3.96 g. per denier, a stretch of 21.3% and dyed well with acid wool, direct and acetate dyes. Similar results are obtained with the other monoolefinic comonomers set out hereinabove. The acrylamidic and methacrylamidic monomers such as N-methyl methacrylamide, N-isopropyl acrylamide, N-butyl acrylamide, and the like are particularly useful and also increase the dyeability of the polymer with amounts of protein in the polymer of 5–50% by weight.

*Example 6*

To a solution of 10 g. of sodium alkylaryl sulfonate (Nacconol NRSS) and 20 g. of chicken feather keratin in 300 ml. of demineralized water was added 80 g. of acrylonitrile, and the mixture was emulsified by stirring and heating to 60° C. Thereafter, 20 ml. of 3% potassium persulfate solution, 0.6 g. of sodium bisulfite, and 0.5 g. of t-dodecyl mercaptan were added. The resulting mixture was maintained at a polymerization temperature of 60° C. for 3 hours by alternate cooling and heating. The viscous slurry thereby obtained was diluted with 200 ml. of water and filtered, washed with acetone, and dried. The yield of polymeric product was 92%. The product was dissolved in dimethyl acetamide to form a 14% solids dope which was spun into 20% dimethyl formamide in water. The resulting fibers were drafted in hot air and, after drafting, had a tenacity of 3.43 g. per denier, an elongation of 18.6%, and dyed well with acid wool dyes.

*Example 7*

A protein-detergent complex was prepared by dissolving 15 g. of alkylaryl sulfonate detergent and 30 g. of soy bean protein in 400 ml. of demineralized water. To the resulting solution of complex was added 70 g. of acrylonitrile, 20 ml. of 3% potassium persulfate, and 0.5 g. of t-dodecyl mercaptan. The resulting mixture was stirred and heated to 60° C. in a nitrogen atmosphere. The temperature was held at 60–65° C. for 4 hours by alternate cooling and heating. The viscous slurry was diluted with water, filtered, washed with acetone and dried to give a product yield of 87%. A clear yellow dope was prepared by dissolving 10 g. of this soy bean protein-acrylonitrile polymer in 58 g. of dimethyl formamide. The dope was spun into a 50:50 water-isopropanol solution, and the resulting fibers were drafted in steam. The fibers had a tenacity of 3.16 g. per denier, a stretch of 17.4%, and good affinity for acid wool dyes.

One of the advantages of the invention is the solubilization of such materials as gelatin and casein by emulsion polymerizing acrylonitrile in the presence of a complex of such proteins. Thus, gelatin, which is insoluble in anhydrous dimethyl formamide, is solubilized during the polymerization. The solubilization also occurs when the acrylonitrile is copolymerized with such other materials as styrene, vinyl acetate, acrylic acid, and similar monoolefinic monomers in admixture with the protein-detergent complex.

*Example 8*

To a solution of 25 g. of gelatin and 10 g. of dioctyl sodium sulfosuccinate in 350 ml. of demineralized water was added 75 g. of acrylonitrile and cyanoethylation was accomplished by heating at 50–60° C. for 30 minutes. The reactor was swept out with nitrogen while cooling to 40° C. Thereafter, 20 ml. of 3% potassium persulfate and 0.5 g. of t-dodecyl mercaptan were added, and the emulsion was heated to 60° C. The resulting cyanoethylated gelatin-acrylonitrile polymer separated out as a viscous white slurry. The slurry was diluted with water, filtered, washed and dried at 75° C. to give a 94% yield of product. A dope containing 17.2% solids in dimethyl formamide was spun into isopropanol, and the resulting fibers were drafted 1200% in hot air at a temperature 140–160° C. The bright, lustrous fibers thereby obtained had a tenacity of 3.41 g. per denier, an elongation of 14%, and an excellent affinity for acid wool, direct, and acetate dyes.

When isopropenyl acetate was employed in this process in conjunction with the acrylonitrile in ratios of from about 5% to about 25% of isopropenyl acetate to 95–75% acrylonitrile and the polymer formed so as to contain 20–30% gelatin, fibers with higher elongations and excellent dyeing properties were obtained. In some cases, the water-soluble proteins such as gelatin and zein can be dissolved in water in the absence of a detergent and cyanoethylated. The cyanoethylated protein is less resistant to molecular orientation than is the native protein. This cyanoethylated protein can then be carried through the process as described to form readily orientable polymeric compositions suitable for the formation of strong, water-resistant fibers.

*Example 9*

The protein employed in practicing the invention can be an acetylated derivative of any of the well known proteins, and such acetylated derivatives are considered to be within the scope of the invention. For example, casein was acetylated with ketene in an aqueous alkali solution having a pH of 11 to give acetyl casein having an acetyl content of 4.2%. A 20 g. portion of the acetyl casein and 80 g. of acrylonitrile were stirred and heated at 50–60° C. in 350 ml. of demineralized water containing 10 g. of dioctyl sodium sulfosuccinate. After 45 minutes, the mixture was cooled to 40° C. and 20 ml. of 3% potassium persulfate and 16 drops of t-dodecyl mercaptan were added. The temperature was held at 55–69° C. by cooling, and the polymerization was complete in 1½ hours. The polymer emulsion was diluted with 150 ml. of water, filtered, washed with water and dried. The yield of polymeric product was 94.2 g. or 94%. This polymer formed a smooth 14% dope in dimethyl formamide containing 3% phosphoric acid. Fibers were spun by extruding into water and drafting 1100% in steam. As indicated, it is sometimes desirable to use an antigelling agent such as phosphoric acid, phosphorous pentoxide, tetraethyl pyrophosphate, or an alkane sulfonic acid in the polymerization or in the solution of the polymer compositions in suitable organic solvents.

*Example 10*

As has been indicated, when acrylonitrile is employed as the sole monomer, it is desirable to have at least 20% protein in the polymer molecule for good dyeing, and amounts up to 50% can be used with increased dye affinity. Thus, 80 g. of acrylonitrile and 20 g. of casein were emulsified in 350 ml. of demineralized water containing 10 g. of dioctyl sodium sulfosuccinate. This mixture was stirred and heated at 55–65° C. for 45 minutes. The mixture was then cooled to 50° C. and 20 ml. of 3% potassium persulfate and 22 drops of t-dodecyl mercaptan were added. The polymerization was effected at 59–66° C. and was complete in 40 minutes. The emulsion was diluted with 150 ml. of water, and the polymeric product filtered off. The product was washed with water, washed with acetone, and dried to give 90.7 g. of product. This polymer formed a 16% dope in dimethyl formamide containing 1% ethane sulfonic acid. The dope was extruded into isopropanol, and the filaments drafted in hot air to form a highly oriented, bright filament having a tenacity of 3.01 g. per denier, an elongation of 16.3%, and a moisture regain of 3.87%. The fibers had a fair affinity for acid wool and direct dyes.

*Example 11*

A mixture of 15 g. of casein, 10 g. of dioctyl sodium sulfosuccinate, and 350 cc. of water was boiled for 30 minutes with occasional stirring. The protein-detergent complex thus formed was allowed to stand for a period of 24 hours to complete ripening. Thereafter, 76.5 g. of acrylonitrile, 8.5 g. of isopropenyl acetate, 1 g. of ammonium persulfate, 1.5 g. of sodium bisulfite, and 0.25 g. of t-dodecyl mercaptan were added to the ripened protein-detergent complex solution. The temperature of the mixture was maintained at 45–52° C. for a period of 6 hours. The product was precipitated with water, filtered off, washed with water, and dried. The yield of product was 87%. A solution of the polymer product in dimethyl formamide was clear, colorless, and smooth. Extrusion of the solution into a coagulated bath gave a monofilament yarn having a strength of 1.7 g. per denier with 15% elongation and a good affinity for acetate and acid wool dyes.

*Example 12*

A protein-detergent complex was prepared by heating 15 g. of soybean α-protein with 10 g. of dioctyl sodium sulfosuccinate in 350 cc. of water. To the ripened protein-detergent complex solution were added 76.5 g. of acrylonitrile, 8.5 g. of isopropenyl acetate, 1.0 g. of ammonium persulfate, 1.5 g. of sodium bisulfite, and 0.25 g. of t-dodecyl mercaptan. The mixture was then heated with stirring at 40–46° C. for 6 hours. The precipitated product was collected on a filter, washed with distilled water, and dried to give an 88% yield of polymer. A solution of the polymer product in dimethyl formamide was extruded into multifilament fibers having a tenacity of 3.1 g. per denier with an elongation of 16%. These fibers showed excellent affinity for acid wool and acetate dyes.

In a similar process a polymer was prepared by polymerizing a mixture of 80 parts by weight of acrylonitrile, 5 parts by weight of methyl acrylate, and 15 parts by weight of egg albumen-detergent complex. The resulting polymer when spun from a 12.1% dimethyl formamide solution gave fibers having a tenacity of 4.76 g. per denier and an elongation of 19%. When soybean-α-protein was substituted for the egg albumen in a similar polymer with acrylonitrile and methyl acrylate, the fibers spun from a 14.4% dope had a tenacity of 3.25 g. per denier and an elongation of 14%. Similar results are obtained with other proteins and other comonomers as described. Similarly, the improved polymer compositions are obtained with complexes from other detergents since the nature of the detergent does not affect the properties of the polymer obtained so long as the detergent is effective to unfold the protein molecule. Thus, any sulfate, sulfonate, or sulfosuccinate detergent which forms a water-soluble complex with a protein gives equally good results.

The polymers embodying the invention are particularly useful in the preparation of synthetic fibers either alone or in combination with other polymeric materials such as polyacrylonitrile. Textiles prepared from such improved fibers have excellent wearing characteristics and are resistant to weathering and leaching. The polymers can also be used for extruding or casting to form films and sheets which can likewise be oriented to give high strength and elongation characteristics. Polymeric films prepared in accordance with the invention find utility for a variety of applications including use as film base for carrying silver halide emulsions in either black-and-white or color photographic materials. The polymers can be prepared by batch processes as described or by continuous processes known to the art. Since the detergent is split out during the polymerization process, it can be used repeatedly for forming additional protein-detergent complex. Thus, the process can be operated economically since the raw material cost depends almost entirely upon the cost of the protein and the monomeric materials. The polymers which are obtained differ from the usual polymers of acrylonitrile and native proteins since the unfolded proteins of this invention can be oriented whereas the native proteins cannot.

The invention thus provides greatly improved polymer compositions having a unique combination of physical and chemical properties and which do not suffer the disadvantages which are normally attendant to polymeric mixtures or to fibers from either unmodified polyacrylonitrile or a native protein.

The invention has been described in considerable detail with reference to certain preferred embodiments thereof, but it will be understood that variations and modifications can be effected within the spirit and scope of the invention as described hereinabove and as defined in the appended claims.

We claim:

1. The method which comprises heating in the presence of a polymerization catalyst a mixture of 5–50% by weight of a detergent-unfolded protein, which detergent-unfolded protein is obtained by heating protein at a temperature of from about 30 to 70° C. with an aqueous solution of a detergent from the group consisting of alkyl, aryl, and alkylaryl sulfonates and alkali metal salts thereof, dialkyl sodium sulfosuccinates, and alkali metal alkyl sulfates, and 95–50% by weight of monomeric material consisting of 75–100% by weight of acrylonitrile and 25–0% by weight of other polymerizable monoolefinic monomeric material and thereby forming a composite unitary fiber-forming polymer.

2. The method of forming a unitary composite polymer of monomeric material and a cyanoethylated unfolded protein obtained by heating, at a temperature of from about 30 to 70° C.; in the absence of a polymerization catalyst, a mixture of protein, acrylonitrile and a detergent from the group consisting of alkyl, aryl and alkylaryl sulfonates and alkali metal salts thereof, dialkyl sodium sulfosuccinates, and alkali metal alkyl sulfates, and thereby forming a cyanoethylated protein-detergent complex, which comprises heating in the presence of a polymerization catalyst a mixture of 5–50% by weight of said cyanoethylated unfolded protein and 95–50% by weight of monomeric material consisting of 75–100% by weight of acrylonitrile and 25–0% by weight of another polymerizable monoolefinic monomer and thereby forming a composite unitary fiber-forming polymer.

3. The method which comprises heating in the presence of a polymerization catalyst a mixture of 20–50% by weight of a complex resulting from heating at a temperature of from about 30 to 70° C. a mixture of a protein and a detergent from the group consisting of alkyl, aryl and alkylaryl sulfonates and alkali metal salts thereof, dialkyl sodium sulfosuccinates, and alkali metal alkyl sulfates, and 80–50% by weight of acrylonitrile and thereby forming a composite unitary fiber-forming polymer.

4. The method of forming a unitary composite polymer of monomeric material and an unfolded protein obtained by heating at a temperature of from about 30 to 70° C. a mixture of a protein and a detergent from the group consisting of alkyl, aryl and alkylaryl sulfonates and alkali metal salts thereof, dialkyl sodium sulfosuccinates, and alkali metal alkyl sulfates; and thereby forming a protein-detergent complex wherein the detergent amounts to from one-third to twice the weight of the protein, which comprises heating in the presence of a peroxy polymerization catalyst an emulsion of a mixture consisting of 20–50% by weight of said protein-detergent complex and 80–50% by weight of a mixture of 75–98% by weight of acrylonitrile and 25–2% by weight of a different polymerizable monoolefinic monomer and thereby forming a composite unitary fiber-forming polymer.

5. The method of forming a unitary composite polymer of monomeric material and an unfolded protein obtained by heating at a temperature of from about 30 to 70° C. a mixture of a protein and a detergent from the group consisting of alkyl, aryl and alkylaryl sulfonates and alkali metal salts thereof, dialkyl sodium sulfosuccinates, and alkali metal alkyl sulfates and thereby forming a protein detergent complex wherein the detergent amounts to from one-third to twice the weight of the protein, which comprises heating in the presence of a peroxy polymerization catalyst an emulsion of a mixture consisting of 20–50% by weight of said protein-detergent complex and 80–50% by weight of a mixture of 75–98% by weight of acrylonitrile and 25–2% by weight of isopropenyl acetate and thereby forming a composite unitary fiber-forming polymer.

6. The method of forming a unitary composite polymer of monomeric material and an unfolded protein obtained by heating at a temperature of from about 30 to 70° C. a mixture of zein and a detergent from the group consisting of alkyl, aryl and alkylaryl sulfonates and alkali metal salts thereof, dialkyl sodium sulfosuccinates, and alkali metal alkyl sulfates, and thereby forming a zein-detergent complex wherein the detergent amounts to from one-third to twice the weight of the zein, which comprises heating in the presence of a peroxy polymerization catalyst an emulsion of a mixture comprising 20–50% by weight of said zein-detergent complex and 80–50% by weight of acrylonitrile and thereby forming a composite unitary fiber-forming polymer.

7. The method of forming a unitary composite polymer of monomeric material and an unfolded protein obtained by heating at a temperature of from about 30 to 70° C. a mixture of casein and a detergent from the group consisting of alkyl, aryl, and alkylaryl sulfonates and alkali metal salts thereof, di-alkyl sodium sulfosuccinates, and alkali metal alkyl sulfates, and thereby forming a casein-detergent complex wherein the detergent amounts to from one-third to twice the weight of the casein, which comprises heating in the presence of a peroxy polymerization catalyst an emulsion of a mixture comprising 20-50% by weight of said casein-detergent complex and 80-50% by weight of acrylonitrile and thereby forming a composite unitary fiber-forming polymer.

8. The method of forming a composite unitary polymer of acrylonitrile, isopropenyl acetate and unfolded zein obtained by heating at a temperature of from about 30 to 70° C. a mixture of zein and dioctyl sodium sulfosuccinate detergent and thereby forming a zein-detergent complex wherein the detergent amounts to from one-third to twice the weight of the zein, which comprises heating in the presence of a peroxy polymerization catalyst an emulsion of a mixture of 20-50% by weight of said zein-detergent complex and 80-50% by weight of monomeric material consisting of 75-98% by weight of acrylonitrile and 25-2% by weight of isopropenyl acetate and thereby forming a composite unitary fiber-forming polymer.

9. The method of forming a composite polymer of acrylonitrile, isopropenyl acetate and unfolded gelatin obtained by heating at a temperature of from about 30 to 70° C. a mixture of gelatin and dioctyl sodium sulfosuccinate detergent and thereby forming a gelatin-detergent complex wherein the detergent amounts to from one-third to twice the weight of the gelatin, which comprises heating in the presence of a peroxy polymerization catalyst an emulsion of a mixture of 20-50% by weight of said gelatin-detergent complex and 80-50% by weight of monmeric material consisting of 75-98% by weight of acrylonitrile and 25-2% by weight of isopropenyl acetate and thereby forming a composite unitary fiber-forming polymer.

References Cited in the file of this patent

UNITED STATES PATENTS

| 2,562,534 | Coffman | July 31, 1951 |
| 2,594,293 | Cowan et al. | Apr. 29, 1952 |

OTHER REFERENCES

Lundgren: "Ind. Eng. Chem.," volume 36, page 370 (1944).